United States Patent

[11] 3,625,835

| [72] | Inventors | Adrianus Tervoort<br>Sittard;<br>Theodorus Balg, Brunssum, both of<br>Netherlands |
|---|---|---|
| [21] | Appl. No. | 46,372 |
| [22] | Filed | June 15, 1970 |
| [45] | Patented | Dec. 7, 1971 |
| [73] | Assignee | Stamicarbon N.V.<br>Heerlen, Netherlands |

[54] PROCESS FOR THE RECOVERY OF CYCLOHEXANONE OXIME BY PLURAL STAGE, VACUUM DISTILLATION PER A
3 Claims, 1 Drawing Fig.

[52] U.S. Cl..................................................... 203/78,
203/80, 260/566 A
[51] Int. Cl...................................................... B01d 3/10
[50] Field of Search............................................ 203/73, 77,
78, 80, 84, 71; 202/158, 154, 172; 260/566 A

[56] References Cited
UNITED STATES PATENTS

| 2,822,393 | 2/1958 | Nicolaisen et al. | 260/566 A |
| 3,275,531 | 9/1966 | Sennewald et al. | 203/84 |
| 3,309,288 | 3/1967 | Butterbaugh | 203/84 |
| 3,518,165 | 6/1970 | Ward | 203/78 |

FOREIGN PATENTS

| 1,138,750 | 1/1969 | Great Britain | 260/566 A |

Primary Examiner—Norman Yudkoff
Assistant Examiner—David Edwards
Attorney—Cushman, Darby & Cushman

ABSTRACT: There is disclosed a continuous process for preparing cyclohexanone oxime by reacting cyclohexanone with a solution of a hydroxylammonium salt derived from a weak acid, e.g. phosphoric acid. The reaction takes place in counterflow contact, and in the presence of a water-immiscible or poorly water-miscible organic solvent for the oxime formed. An improved process for accomplishing separation of the resulting oxime from the solvent by rectification and apparatus suited for realizing this process.

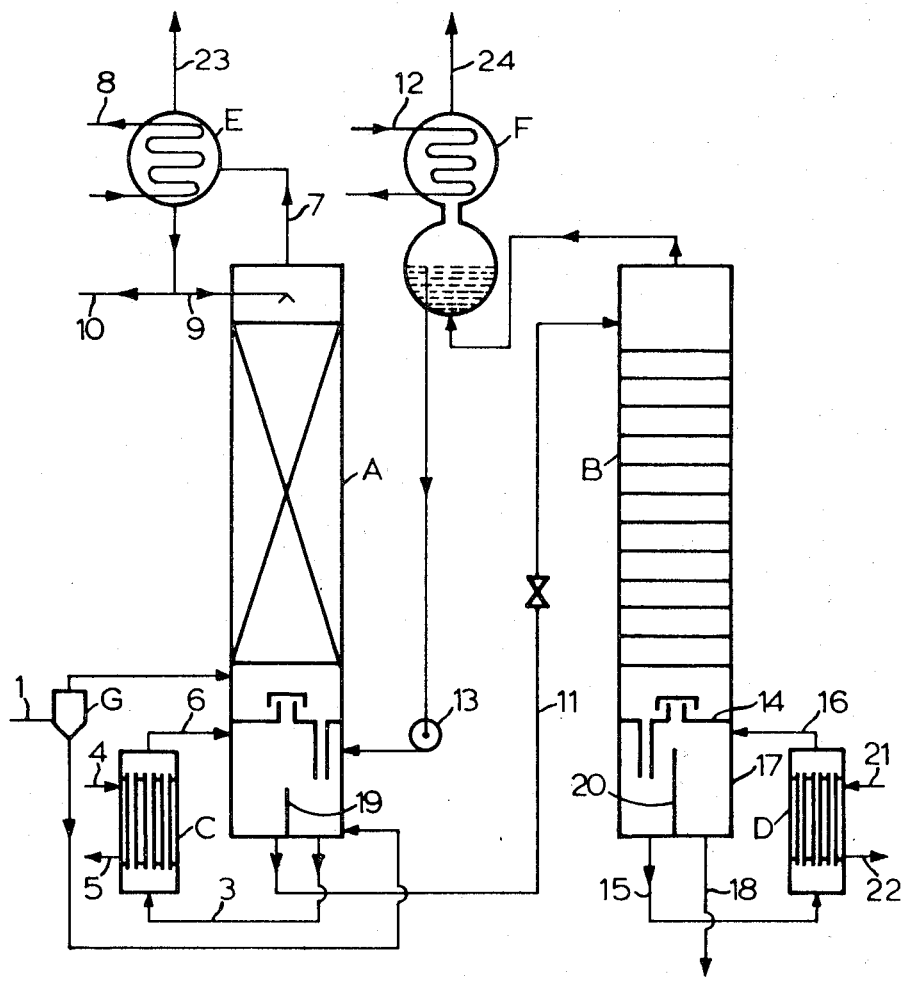

PROCESS FOR THE RECOVERY OF CYCLOHEXANONE OXIME BY PLURAL STAGE, VACUUM DISTILLATION PER A

BACKGROUND OF THE INVENTION

It is known that such substances as e.g., benzene, toluene, xylenes, methyl cyclopentane and cyclohexane are theoretically useful as organic solvents for use in manufacturing cyclohexanone oxime, these being solvents with boiling points much lower than that of cyclohexanone oxime, which ought to render separation by a single distillation quite possible.

However, cyclohexanone oxime is particularly temperature sensitive, and in treatments in which the cyclohexanone oxime is kept at a high temperature—e.g. 160° C.—for rather a long time, its quality, as well as the quality of the $\epsilon$-caprolactam to be prepared from this oxime by rearrangement, will be adversely influenced.

Therefore, in carrying out the separation in a single-distillation column, it appears desirable to keep the temperature low, and to drive out the solvent under a reduced pressure.

In practice this will meet with objections, because it is impossible to satisfy different demands at the same time. If, for instance, one should want to work at such a low pressure that the bottom temperature does not have an adverse influence on the oxime, the top temperature will be so low that the top product can no longer be condensed by means of ordinary cooling water, so that cooling will have to be effected for instance by means of cold generated by evaporating ammonia, which is a costly matter.

According to the summary of the invention to obtain a cyclohexanone oxime satisfying high quality demands if the separation by distillation between organic solvent and dissolved cyclohexanone oxime is carried out in vacuo in two stages, in such a way that in the first distillation stage a pressure prevails at which the vaporous top product—the pure solvent—can still be condensed with ordinary cooling water, i.e. water existing at a temperature of 0° to 30° C. without having been artificially refrigerated and from this stage a bottom product is discharged which, in addition to oxime, contains 5–30 moles percent of solvent. After this, in a second stage, operated at a lower pressure than the first, the remainder of the solvent is distilled off, the heat needed for this distillation being imparted to the bottom liquid collected in the second stage by heating a stream of bottom liquid to be discharged continuously, with formation of a vapor phase and molten oxime virtually free of solvent, and subsequently, following separation of the vapor from the molten oxime, the vapor is returned to the distillation column, while the molten oxime is removed as product.

This mode of heat supply can be accomplished by passing the bottom liquid collected in the distillation column through a heat exchanger designed as a vertical "one-pass" evaporator.

In view of the heat sensitivity of the oxime the temperature in the bottom part of the second column will preferably be kept below 170° C., and more in particular between 120° and 140° C.

Among the above-mentioned solvents, toluene is to be preferred for reasons of technology, not only because this is less volatile than any of the others (with the exception of the xylenes), so that the evaporation losses will be smallest, but also because under the prevailing distillation conditions the toluene vapor can be condensed through heat exchange with ordinary cooling water.

Xylenes, although even less volatile than toluene, are economically unattractive, because in the pure state they are too expensive, and they cannot be used in the impure condition, since this would cause contamination of the oxime.

If toluene is used, allowance has to be made for the fact that at a pressure of 40 mm. Hg or lower from a mixture of toluene and oxime vapors upon condensation solid oxime can be formed, as a result of the intersection of the liquid line pertaining to the liquid-vapor equilibrium and the solubility line.

In order that hindrance from such formation of solid substance may be obviated, either the mixture is condensed in a wetted-wall condenser, in which case solid oxime dissolves again in the liquid circulating along the wall, or the vapor is condensed in a condenser designed as a gas-liquid reactor, in which case solid oxime is likewise directly dissolved in condensate unsaturated with oxime.

The quality improvement resulting from distillation in two stages according to the invention can be enhanced if the starting material, the solution of oxime in the organic solvent, is washed with water or dilute ammonia water prior to being subjected to the distilling process, in order that remnants of dissolved salts, coming from the solution of a hydroxylammonium salt used in the oxime preparation, may be removed.

The distillations can be performed either in columns equipped with plates or in columns filled with packing bodies.

Since as a result of the presence of contaminants in toluene foaming may sometimes occur at the start of the distillation, the first distillation is preferably carried out in a column filled with packing bodies (exemplified by e.g. Raschig rings, Berl saddles, Pall rings), whereas the second column may be equipped with sieve plates.

BRIEF DESCRIPTION OF THE DRAWING

Apparatus for carrying out the process is shown in the FIGURE.

DETAILED DISCUSSION OF THE INVENTION

In the FIGURE A and B represent distillation columns with respective heaters C and D for heating the bottom liquid. Top product coming from the columns is condensed in condensers E and F, respectively. When the apparatus is operating, a preheated solution of oxime in, e.g., toluene, with an oxime content of e.g. 25 mole percent is admitted into the base of distillation column A through line 1 and gas-liquid separator G. In this column a distillation is effected under a pressure of e.g., 150mm. Hg. The liquid collecting on the bottom of column A is sent to tubular heater C through line 3. The tubular heater is heated by means of steam supplied through line 4, and the condensate is removed through line 5. The liquid-vapor mixture formed in tubular heater C, which mixture has a temperature of, e.g., 125° C., is returned to the column through line 6.

The toluene vapor to be discharged from the top of column A through line 7 is condensed in condenser E by indirect heat exchange with cooling water flowing through cooling spiral 8; part of the condensate is refluxed to column A through line 9, the remainder of the toluene being returned to an oxime synthesis zone (not shown) through line 10. The bottom product collected in column A, with, e.g. 70–95 mole percent of oxime contained in it, is through line 11 continuously expanded into the top of column B, where a pressure of e.g. 40–100 mm. Hg prevails. The vapors coming from column B, a mixture of toluene and oxime, with e.g. 25–35 mole percent of oxime, having a temperature of e.g. 100°–120° C., are condensed in a bubble-washer condenser F by indirect heat exchange with cooling water flowing through spiral 12, which produces a condensate having a temperature of e.g. 38° C. This condensate is returned to column A through a pump 13. The base of column A, in which liquid-phase material collects, is divided into two parts by a partition 19, to prevent mixing of oxime-rich and oxime-poor material.

Through the discharge in the chimney plate 14 an oxime virtually free of solvent collects in the base of column B. To supply the necessary heat to column B, needed there to heat the feed and to provide the necessary heat of evaporation, the bottom product is sent once, through line 15, through tubular heater D, this giving rise to the formation of a mixture of liquid and vapor having a temperature of, e.g. 150° C., which mixture is passed through line 16 into the bottom section 17 of column B, which is designed as a liquid-vapor separator. The liquid oxime recovered leaves the column through line 18, and the vapors rise through the column via chimney plate 14.

As with column A, so, also with column B the base, in which liquid-phase material collects, is separated into two parts by a partition 20; oxime passed once through heater D can thus be collected apart from oxime that is still to be heated. Tubular heater D, like heater C, is heated by means of steam supplied through line 21, and the condensate is removed through line 22. Condensers E and F are connected by lines 23 and 24 to pumps maintaining the underpressure in columns A and B.

The invention will now be illustrated by the following example of an oxime production of approximately 8900 kg./hour.

EXAMPLE

To the distillation column (A) packed with Pall rings over a height of 20 feet equivalent to four theoretical plates, and operating at a pressure of 150 mm. Hg at the column top and at a temperature of 60° C. are fed through conduit 1 29,000 kg./hour of a solution having a temperature of 51° C. and being composed of 70 percent by weight of toluene
29 percent by weight of cyclohexanone oxime
1 percent by weight of water.

The vapors withdrawn from the column top through conduit 7 are condensed in a condenser at a temperature of 40°–60° C.

The condensation heat is removed by means of cooling water through conduit 8; inlet temperature 15°–20° C., outlet temperature 23°–30° C.

The condensed toluene (95 percent by weight of toluene, 5 percent by weight of water and less than 0.005 of oxime) is divided into two parts, 7,000 kg./hour are recycled through conduit 9 as reflux, and 21,000 kg./hour are withdrawn through conduit 10 and fed to the oximation stage (not shown) as solvent for the oxime.

The heater C is heated with steam of 110°–115° C.

Of the bottom product collected in column A 14,300 kg./hour is fed to distillation column B.

The bottom product is composed of
25 percent by weight of toluene
75 percent by weight of oxime, and
about 0.35 percent by weight of water (mole percent of toluene: 28 percent).

The distillation column B, operating at a pressure of 95 mm. Hg at the column top and at a temperature of 119° C. contains 13 actual plates equivalent to four theoretical plates. The vapors withdrawn from the top are condensed in condenser F, the condensation heat is removed by means of fresh cooling water having an inlet temperature of 5° C. and an outlet temperature of 18°–23° C.

Condensed vapors, in an amount of 5,400 kg./hour, are supplied by pump 13 to the bottom part of column A, the vapors are composed of:
64 percent by weight of toluene
35 percent by weight of oxime
1 percent by weight of water.

The heater D is heated with steam of 160°–165° C. which brings the temperature of the bottom product collected in column B at 150° C. Through conduit 18 8,900 kg./hour of oxime is withdrawn containing less than 0.02 percent by weight of toluene.

What is claimed is:

1. In a process wherein cyclohexanone and a solution of hydroxylammonium salt in the presence of a nonpolar solvent selected from the group consisting of benzene, toluene, xylenes, methyl cyclopentane and cyclohexane for cyclohexanone oxime are reacted in counter flow and the resulting oxime continuously removed in the solvent, a process for recovering the oxime from the solvent, comprising:

heating the oxime solution and effecting a separation through distillation below atmospheric pressure in a first stage to produce a vaporous top product of substantially pure solvent and a bottom product of substantially oxime and up to 30 percent solvent;

condensing the vaporous top product by indirect heat exchange with cooling water having a temperature of 0° to 30° C.

distilling the remaining solvent from the bottom product in a second stage at a lower pressure than the first stage to produce a vaporous second stage top product containing oxime and a second stage bottom liquid;

this distillation step including heating a stream of the second stage bottom liquid to form a vapor phase and a liquid phase of substantially solvent-free molten oxime;

separating the vapor phase from the molten oxime and returning the former, constituting second stage vaporous top product to the first distillation stage.

2. The process of claim 1 wherein, as a preliminary step, the oxime solution is washed with water.

3. The process of claim 1 wherein, as a preliminary step, the oxime solution is washed with dilute NH$_4$OH.

* * * * *